United States Patent
Mansur

Patent Number: 6,119,791
Date of Patent: Sep. 19, 2000

[54] APPARATUS/METHOD FOR REFORMING CULTIVATION ROWS

[75] Inventor: Peter Lloyd Mansur, Mudgee, Australia

[73] Assignee: Great Western Corporation PTY LTD, Queensland, Australia

[21] Appl. No.: 09/272,573

[22] Filed: Mar. 19, 1999

[30] Foreign Application Priority Data

Mar. 19, 1998 [AU] Australia ............................... PP 2464

[51] Int. Cl.[7] ................................................. A01B 13/02
[52] U.S. Cl. ......................... 172/701; 172/700; 172/695
[58] Field of Search .................................. 172/700, 701, 172/699, 685, 687, 688, 691, 694, 695, 765, 770, 12, 12.5, 219

[56] References Cited

U.S. PATENT DOCUMENTS

| | | | |
|---|---|---|---|
| 4,245,706 | 1/1981 | Dietrich, Sr. ............................. | 172/180 |
| 4,403,662 | 9/1983 | Dietrich, Sr. ............................. | 172/156 |
| 4,454,920 | 6/1984 | Dietrich, Sr. ............................. | 172/464 |
| 4,489,787 | 12/1984 | Gary ........................................... | 172/1 |
| 4,779,684 | 10/1988 | Schultz ....................................... | 171/62 |
| 4,785,891 | 11/1988 | Noland ....................................... | 172/579 |
| 5,031,704 | 7/1991 | Fleischer et al. .......................... | 172/6 |
| 5,076,368 | 12/1991 | Harrell ........................................ | 172/219 |
| 5,285,854 | 2/1994 | Thacker et al. ............................ | 172/176 |
| 5,984,017 | 11/1999 | Packham ..................................... | 172/1 |

*Primary Examiner*—Victor Batson
*Attorney, Agent, or Firm*—Young & Thompson

[57] ABSTRACT

An apparatus 30 has an elongate body 32 and spaced booms extending downstream from the body 32 for operation on a field having a plurality of rows having mounds 4 to 12 and furrows 14 to 22. Blades 34 and 36 for moving about 50 mm of material 24 and a thin layer of soil inwardly from the mounds 4 to 10 are fixed to respective shank supports 38 and 40 which are joined to the body 32. Blades 42 and 44 for moving the soil outwardly from respective mounds 4,6,8 and 10 are also fixed to the supports 38 and 40. The blades 42 and 44 are positioned about 50 mm lower than the blades 34 and 36. The apparatus 30 has two sets of blades 34 and 36 and two sets of blades 42 and 44 positioned next to each other. Fixed to short booms are listers 46 for moving the material 24 in furrows 16 and 20 onto mounds 4 to 10. Fixed to long booms are listers 48 for reforming the mounds 4 to 10 by moving soil over the material on the mounds 4 to 10 and shaping the mounds at the same time.

10 Claims, 2 Drawing Sheets

6,119,791

APPARATUS/METHOD FOR REFORMING CULTIVATION ROWS

FIELD OF THE INVENTION

THIS INVENTION relates to a method/apparatus for reforming rows in field cultivation and in particular but not limited to a method/apparatus for reforming rows prior to replanting cotton.

BACKGROUND OF THE INVENTION

Plants such as cotton are generally cultivated in rows of mounds. A furrow is also formed between adjacent mounds.

A dressing of material over the mounds and the furrows occurs following a certain cultivation action, fire or in adverse weather conditions. It is usual to renovate rows prior to replanting. This is more cost effective than complete primary tilling and row forming.

OBJECT OF THE INVENTION

It is desirable to reform the cultivation rows of mounds and furrows while at the same time burying the material.

It is a primary object of the present invention to provide a method and apparatus for reforming rows in field cultivation and clearing as a consequence of that method and material over the rows and delivering that material to a subsurface level.

SUMMARY OF THE INVENTION

A row reforming apparatus for use in a row cropping process involving renovation of existing rows comprising alternating mounds and furrows, the apparatus having tools which move in a direction of travel parallel to the rows, the apparatus having a first tool adapted to move an upper section of a mound into a first furrow on one side of the mound, a second tool following said first tool and being adapted to move a further section of said mound into a second furrow on the opposite side of the mound, a third tool following said second tool and being adapted to move material from the first furrow back onto the mound and a fourth tool following the third tool and being adapted to move material from the second furrow back onto the mound. Preferably the first and second tools are mounted on a common shank.

Preferably, the first and second tools for moving the upper moving section and further section of material comprise four blades mounted on a single shank the blades being inclined to the direction of travel and in plan forming a cross configuration.

Preferably the third and fourth tools comprise V-shaped blades having an apex and wings, the V-shaped blades being mounted to travel in the furrows with the apex leading.

Preferably the first tool is mounted for height adjustment.

Preferably the second tool is mounted for height adjustment.

In one preferred embodiment the present invention resides in a method of reforming rows in field cultivation using a row reforming apparatus drawn behind a prime mover, the rows having mounds and furrows between adjacent mounds, the method comprising the following steps:

(a) moving an upper section, from each of first and second adjacent mounds into a first furrow between the mounds;

(b) further moving soil from the said adjacent mounds into respective second and third furrows, each said second and third furrow being next to each one of said adjacent mounds but not being said first furrow;

(c) moving material from said first furrow back onto said adjacent mounds; and (d) reforming the adjacent mounds by moving material in said second and third furrows back onto said adjacent mounds from which said material was removed.

In a second preferred aspect the present invention resides in a method of simultaneously reforming groups of rows in field cultivation, the rows having mounds and a furrow between adjacent mounds, the method comprising the steps of:

(a) moving material from selected mounds into a first group of alternate furrows;

(b) moving material from the selected mounds into a second group of alternate furrows between the furrows of the first group;

(c) moving the material from said first alternate furrows onto the selected mounds; and (d) reforming the selected mounds by moving material from said second group of alternate furrows over the material on the selected mounds.

In a further preferred aspect, the present invention resides in an apparatus for reforming rows in field cultivation and the rows having mounds and furrows between adjacent mounds. The apparatus comprises a first tool for moving material from adjacent mounds into a first furrow between the mounds, a second tool for moving soil from the adjacent mound into second furrows each of which is next to one of the adjacent mounds, a third tool for moving the material onto the adjacent mounds and a fourth tool for reforming the adjacent mounds by moving the soil in the second furrows over the material on said adjacent mounds.

In a fourth preferred aspect the present invention resides in an apparatus for reforming rows in field cultivation, the rows having mounds and a furrow between adjacent mounds. The apparatus comprises a set of first tools for moving material from selected mounds into first alternate furrows, a set of second tools for moving soil from the selected mounds into second alternate furrows, a set of third tools for moving the material from said first alternate furrows onto the selected mounds and a set of fourth tools for reforming the selected mounds by moving the soil in said second alternate furrows over the material on the selected mounds.

It is preferred that the or each first tool includes a pair of blades which are arranged divergently from each other. In operation the blades move the material from adjacent mounds inwardly into a furrow between the adjacent mounds.

Desirably, the blades are positioned to extend substantially over a major portion of respective corresponding mounds.

Each of the blades may have a guide member for guiding the material into a furrow.

Typically the blades of the or each first tool is set to about 50 mm or any other desired depth below the top of the mounds. Conveniently the blades are adjustable so that an operator may adjust the depth to suit a particular operation.

In preference the or each second tool is positioned downstream of the corresponding first tool and the or each said second tool includes a pair of blades which are arranged divergently from each other. In operation the blades move soil from the adjacent mounds outwardly into furrows next to the adjacent mounds.

As for the blades of the first tool these blades may also be positioned to extend substantially over a major portion of respective corresponding mounds.

These blades may also have guide members for guiding the material into the adjacent furrows.

The blades of the or each second tool may be set at any depth lower than the depth of the blades of the first tool. But typically they are about 50–100 mm lower. As for the blades of the first tool, these blades can also be made adjustable.

Advantageously the apparatus has an elongate body and a plurality of spaced boom members extending in a downstream direction from the body. Typically the first and second tools are fixed to the body and each of the third and fourth tools fixed to one of the boom members.

Each of the third and fourth tool may be in the form of a plough but preferably a lister.

It should be noted that the term material as described herein includes clean soil, and trashy soil having mulch, branches, leaves and any other vegetation matters mixed with the soil.

In order that the present invention can be readily understood and put into practical effect the description will now refer to the accompanying diagrams which illustrate a non-limiting embodiment of the present invention, and wherein:

BRIEF DESCRIPTION OF THE INVENTION

FIG. 1 is a diagram showing the method according to the present invention during different operating step; and FIG. 2 is a top view of a schematic diagram of an apparatus according to the present invention.

DETAILED DESCRIPTION OF THE INVENTION

Figure 1:
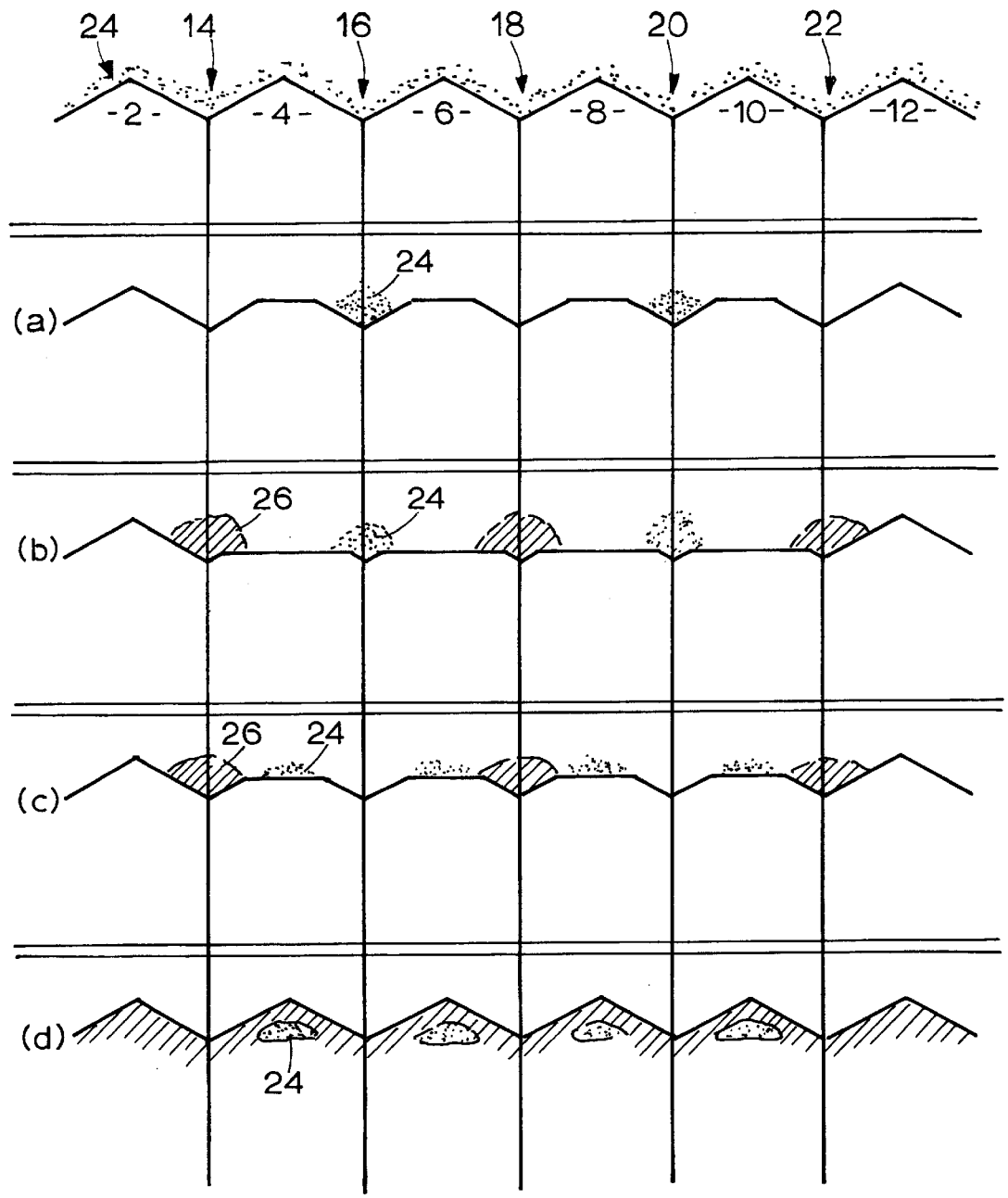

Referring initially to FIG. 1, there is shown a cross-sectional view of a plurality of cultivation rows having mounds 2 to 12 and furrows 14 to 22. As can be seen, prior to step (a) the rows have a dressing of material 24 which may be caused during harvesting or uprooting of plants such as cotton.

It step (a) of the method of the present invention about 50 mm of the material 24 and some soil have been removed from the mounds 4 to 10.

The removed material 24 and soil are moved into alternate furrows 16 and 20.

In step (b) the mounds 4 to 10 are further reduced in height by about 50 mm and the soil 26 from the mounds 4 to 10 are moved into furrows 14, 18 and 22.

In step (c) the material 24 in the furrows 16 and 20 are moved to the top of the reduced mounds 4 to 10.

FIG. 1 (*d*) shows the soil 26 are moved over the material 24 in position shown in step (c). At the same time the rows are reformed and the material 24 is buried.

As can be seen following step (d) the rows are reformed to substantially the original shape except that the dressing of material 24 is buried in the soil.

Figure 2:
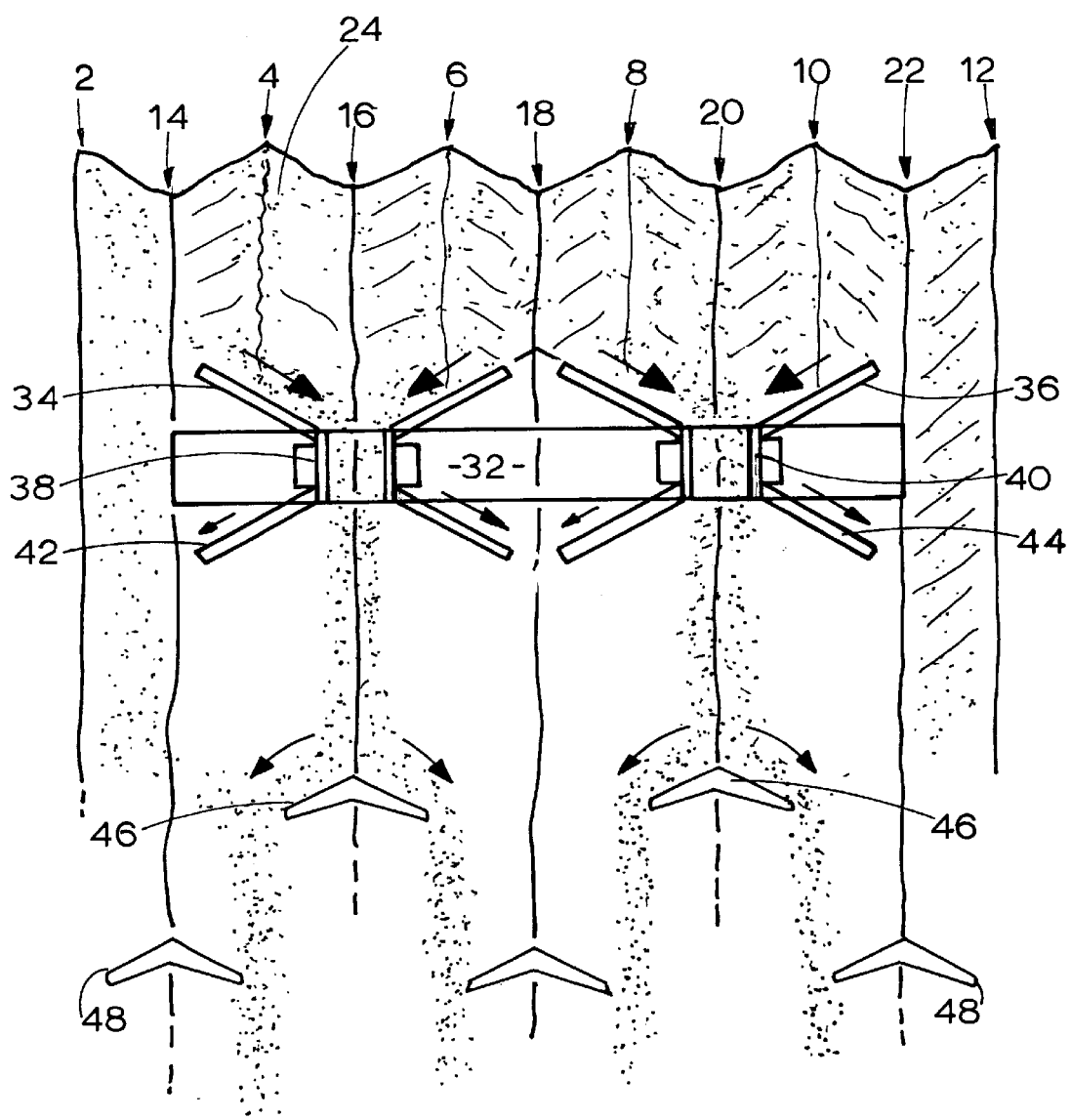

Referring now to FIG. 2 which shows an apparatus 30 according to the present invention in operation on a field having a plurality of rows having mounds 4 to 12 and furrows 14 to 22 as described in FIG. 1.

The apparatus 30 has an elongate body 32 and spaced booms (not shown) extending downstream from the body 32. Blades 34 and 36 for moving about 50 mm of material 24 and a thin layer of soil inwardly from the mounds 4 to 10 are fixed to respective shank supports 38 and 40 which are joined to the body 32.

Blades 42 and 44 for moving the soil outwardly from respective mounds 4, 6 and 8 and 10 are also fixed to the supports 38 and 40. The blades 42 and 44 are positioned about 50 mm lower than the blades 34 and 36.

As can be seen the apparatus 30 has two sets of blades 34 and 36 and two sets of blades 42 and 44 positioned next to each other.

Fixed to short booms (not shown) are listers 46 for moving the material 24 in furrows 16 and 20 onto mounds 4 to 10.

Fixed to long booms (not shown) are listers 48 for reforming the mounds 4 to 10 by moving soil 26 (see FIG. 1) over the material 24 on the mounds 4 to 10 and shaping the mounds at the same time.

In operation, the apparatus 30 is towed behind a tractor (not shown) and moves in a forward direction in which the blades 34 and 36 are upstream. The arrows show directions of movement of the material 24 and soil 26 when the apparatus are in motion. The sequence described in steps (a) to (d) takes place automatically as the apparatus is moving.

Whilst the above has been given by way of illustrative example of the present invention many variations and modifications thereto will be apparent to those skilled in the art without departing from the broad ambit and scope of the invention as herein set forth in the appended claims.

The claims defining the invention are as follows:

1. A row reforming apparatus for use in a row cropping process involving renovation of existing rows comprising alternating mounds and furrows, the apparatus having tools which move in a direction of travel parallel to the rows, the apparatus having a first tool adapted to move an upper section of a mound into a first furrow on one side of the mound, a second tool following said first tool and being adapted to move a further section of said mound into a second furrow on the opposite side of the mound, a third tool following said second tool and being adapted to move material from the first furrow back onto the mound and a fourth tool following the third tool and being adapted to move material from the second furrow back onto the mound on top of the material moved by the third tool.

2. A row reforming apparatus according to claim 1 wherein the first and second tools are mounted on a common shank.

3. A row reforming apparatus according to claim 1 wherein the first and second tools are a first pair of blades of a four blade set mounted on a single shank, each blade of the set being inclined to the direction of travel and the set in plan forming a cross configuration.

4. A row reforming apparatus according to claim 1 wherein the third and fourth tools comprise V-shaped blades having an apex and wings, the V-shaped blades being mounted to travel in the furrows with the apex leading.

5. A row reforming apparatus according to claim 1 wherein the first tool is mounted for height adjustment.

6. A row reforming apparatus according to claim 1 wherein the second tool is mounted for height adjustment.

7. A row reforming apparatus according to claim 1 wherein the first and second tools are mounted on a common shank, the first and second tools being mounted for height adjustment.

8. A row reforming apparatus according to claim 1 wherein the first and second tools are a first pair of blades of a four blade set mounted on a single shank, each blade of the set being inclined to the direction of travel and the set in plan forming a cross configuration, the third and fourth tools comprise V-shaped blades having an apex and wings, the V-shaped blades being mounted to travel in the furrows with the apex leading.

9. A row reforming apparatus according to claim 1 wherein the first and second tools are a first pair of blades of a four blade set mounted on a single shank, each blade of the set being inclined to the direction of travel and the set in plan forming a cross configuration, a further shank having a further four blade set mounted on said further shank, the further four blade set in plan forming a cross configuration.

10. A row reforming apparatus according to claim 1 wherein the first and second tools are a first pair of blades of a four blade set mounted on a single shank, each blade of the set being inclined to the direction of travel and the set in plan forming a cross configuration, a further shank having a further four blade set mounted on said further shank, the further four blade set in plan forming a cross configuration, the third and fourth tools comprise V-shaped blades having an apex and wings, the V-shaped blades being mounted to travel in the furrows with the apex leading.

* * * * *